United States Patent [19]

Bogenschutz

[11] 4,420,066
[45] Dec. 13, 1983

[54] CAM LOCK SLACK ADJUSTER

[75] Inventor: Thomas M. Bogenschutz, Clayton, N.Y.

[73] Assignee: General Signal Corporation, Stamford, Conn.

[21] Appl. No.: 300,829

[22] Filed: Sep. 10, 1981

[51] Int. Cl.³ ............................................. F16D 65/54
[52] U.S. Cl. .............................. 188/107; 188/196 P; 188/199; 92/20; 92/21 MR
[58] Field of Search ............... 188/67, 68, 71.8, 72.6, 188/79.5 GE, 79.5 K, 79.5 S, 106 F, 107, 136, 153 R, 153 D, 153 A, 196 P, 198, 199, 201, 265, 343; 60/442; 92/18, 20, 21 R, 21 MR, 24, 27, 28, 113, 114; 303/89; 91/44; 192/70.23, 70.25, 114 R

[56] References Cited

U.S. PATENT DOCUMENTS

| 2,251,379 | 8/1941 | Van der Hof | 188/196 P |
|---|---|---|---|
| 2,905,277 | 9/1959 | Cagle | 188/196 P |
| 2,946,408 | 7/1960 | Peras | 188/196 P |
| 3,371,750 | 3/1968 | Schutte et al. | 188/196 P |
| 3,371,753 | 3/1968 | Meier | 188/196 P |
| 3,405,787 | 10/1968 | Meier et al. | 188/265 |
| 3,435,920 | 4/1969 | Klaue | 188/196 P |
| 3,508,794 | 4/1970 | Engle | 188/265 |
| 3,550,731 | 12/1970 | Roselius et al. | 188/153 R |
| 3,702,125 | 11/1972 | Jeffries | 188/196 P |
| 3,707,309 | 12/1972 | Engle | 188/265 |
| 3,946,642 | 3/1976 | Bogenschutz | 92/24 |

FOREIGN PATENT DOCUMENTS

| 1428249 | 3/1967 | France | 188/71.8 |
|---|---|---|---|
| 360257 | 6/1938 | Italy | 188/198 |
| 1258029 | 8/1972 | United Kingdom | 188/199 |

*Primary Examiner*—Douglas C. Butler
*Assistant Examiner*—R. R. Diefendorf
*Attorney, Agent, or Firm*—Thomas R. FitzGerald; Harold S. Wynn

[57] ABSTRACT

A brake cylinder comprises a brake actuator device having a fluid operable piston and a coaxial adjoining hand brake operable device for axial actuation of a coaxial tubular push rod, there being a slack adjuster for selectively adjusting the retraction of the push rod. An actuating rod is connected to the piston and the actuating rod is selectively connected and disconnected from the internal periphery of the push rod by locking rollers selectively cooperating with a wedge shaped annulus disposed between the actuator rod and the inner periphery of the push rod. Slack adjustment is permitted by axial travel of the push rod beyond free travel limits as permitted by a friction sleeve connection between the outer periphery of the push rod and the brake cylinder housing. In a modification, the locking device is provided for a fluid spread brake cylinder that is adapted by levers to be connected to a conventional freight brake rigging to be used, for example, for hand brake applications.

4 Claims, 3 Drawing Figures

4,420,066

CAM LOCK SLACK ADJUSTER

REFERENCE TO PRIOR CASES

This invention is related to prior U.S. Pat. Nos. 3,508,794, 3,946,642 and 3,707,309, which are assigned to the same assignee as the present application and an instruction pamphlet No. 79, dated May, 1971, describing brake equipment for a commuter passenger car braking system published by New York Air Brake Company of Watertown, New York, which are in part incorporated herein by reference for defining background material for the present invention.

BACKGROUND OF THE INVENTION

This invention relates to combined brake actuators, slack adjustors and locks for railway vehicle brakes, and while the invention is subject to a wide range of applications, a preferred embodiment of the invention will be particularly described as applied to a combined brake actuator, slack adjustor and lock for railway vehicles that is governed by fluid pressure for service brake application and also by operation of a hand brake.

The present invention is particularly useful in a braking systems such as is disclosed, for example, in the Engle U.S. Pat. Nos. 3,508,794 and 3,707,309 which are assigned to the same assignee as is the present invention. These patents, together with my U.S. Pat. No. 3,946,642 are incorporated by reference in the present application. According to the Engle U.S. Pat. No. 3,707,309 braking of a vehicle is selectively rendered effective by fluid braking pressure applied to brake cylinders of the "spread" cylinder type that are suspended horizontally on hangers between tread brakes associated with wheels at each side of a railway truck for longitudinal expansion in response to fluid pressure to apply braking pressures to both wheels on the same side of each railway truck. According to this patent, fluid is applied to the cylinder through a booster which converts input fluid pressure to hydraulic pressure, and includes a hydraulic slack adjustor to automatically adjust for wear in the brake shoes. The "spread" type brake cylinder of my U.S. Pat. No. 3,946,642 is adapted for hand brake operation as well as service brake operation, and includes a fluid controlled lock for mechanically locking a push rod in its braking position. The brake cylinder according to this patent, requires an external slack adjuster device, such as disclosed in the Engle patent as being a part of the booster, for example.

An object of the present invention is to provide an improved combined brake actuator, slack adjuster, and lock for railway vehicle brakes which substantially obviates one or more of the limitations and disadvantages of the described prior art systems.

Another object of the present invention is to selectively apply fluid braking and locking to a push rod within a tubular portion thereof.

Other objects, purposes and characteristic features of the present invention will be in part obvious from the accompanying drawings, and in part pointed out as the description of the invention progresses.

SUMMARY OF THE INVENTION

A combined brake actuator, slack adjuster, and lock for railway vehicle brakes is provided having a brake cylinder housing containing a fluid operable piston and a coaxial adjoining hand brake operable device for actuating a coaxial tubular push rod for governing application of brakes of a vehicle through an automatic non-threading slack adjusting device contained within the housing in response to either fluid pressure in a chamber within the brake cylinder housing or actuation of a hand brake operable device.

The slack adjusting device adjustably connects the piston to the push rod and comprises an actuating rod, one end of which is connected to the piston, and the other end of which extends within the tubular push rod for selectively actuating the push rod in accordance with the axial actuation of the piston. Annular locking rollers are disposed on an axially adjustable annulas within the tubular push rod for selectively securing the actuating rod to the push rod. The outer periphery of the push rod has a friction sleeve thereon that is contained in area restricted for free axial movement of the push rod within the fixed brake cylinder housing to automatically disconnect the push rod from the locking rollers when the push rod is retracted upon release of the brakes. By this arrangement, the extended length of the push rod is adjustable in accordance with wear of the brake shoes and the push rod can be forcibly retracted further to provide clearance, for example, for the replacement of brake shoes.

In a modification, the locking device is provided for a fluid spread brake cylinder that is adapted by levers and a lower connecting rod to be connected to a conventional freight brake rigging to be used, for example, for hand brake applications.

For a better understanding of the present invention, together with other and further objects thereof, reference is had to the following description, taken in connection with the accompanying drawings, while its scope will be pointed out in the appending claims.

IN THE DRAWINGS

Figure 1:
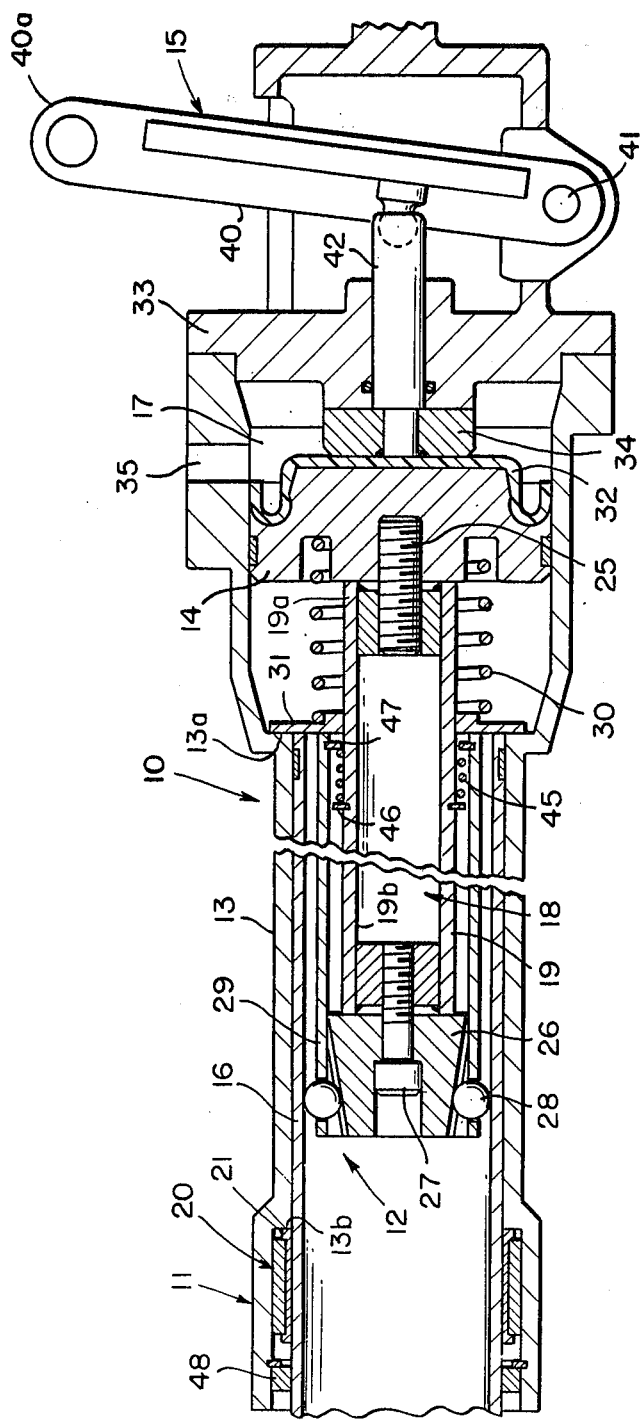
FIG. 1 is an axial sectional view of a spread cylinder braking device with some parts broken away, of a fluid and hand brake actuating, slack adjusting, and locking device according to a preferred embodiment of the present invention.

With reference to FIG. 1 of the drawings, a spread cylinder braking device comprises a slack adjuster 11, and a lock 12 for actuating railway vehicle brakes having a cylindrical brake housing 13 containing a fluid operable piston 14 and coaxial adjoining hand brake responsive device 15 operable, when rendered effective, to move piston 14 to the left to actuate a coaxial tubular push rd 16 for governing application of brakes of a vehicle through a slack adjusting device 11 in response to either fluid pressure in a brake cylinder chamber 17 or actuation of the hand brake device 15.

An actuating rod device 18 has an actuating rod 19, one end 9a of which is connected to the piston 14, and the other end 19b of which extends within the tubular push rod 16 for selectively axially actuating the push rod 16 in accordance with axial actuation of the piston 14.

An annular locking device 12 is disposed within the tubular push rod 16 and secured in part to the end 19a of the actuating rod 19 and operable to selectively operably connect the actuating rod device 18 to the inner periphery of the push rod 16.

A slack adjusting device 10 includes a friction sleeve 21 on the portion of the outer periphery of the push rod 16 having restricted free axial movement within the housing 13 for causing axial adjustment of the push rod 16 relative to the actuating rod for automatic slack adjustment to compensate for wear in the brakes.

More specifically, the actuating rod 19 is suitably secured to the piston 14 by a stud 25, and the left hand end of the rod 19 has secured thereto a conical wedge 26 by a stud 27. Locking rollers 28 are secured in a annulus at the left hand end of a tubular rod 29 that is coaxial with the actuating rod 19 and the inner periphery of the push rod 16. The rollers 28 are disposed to selectively connect and disconnect the actuating rod 19 to the push rod 16 by being wedged between the outer periphery of the conical wedge 26 of the actuating device 18 and the inner periphery of the push rod 16.

The piston 14 is normally biased to a right hand position within a right hand stepped portion of the cylinder housing 13 by a spring 30 that is disposed with its right hand end bearing upon a recess in the piston 14 and its left hand end bearing against a flange 31 that is normally retained against a shoulder 13a in the cylindrical housing 13. The right hand side of piston 14 has a seal 32, the central portion of which bears against an end plate 33, through a spacer 34 completing the enclosure of the operating chamber 17 which can be connected to a source of fluid pressure through a port 35.

The hand brake device 15 comprises an operating lever 40 that is pivoted at 41 for the axial operation of the hand brake rod 42 that is coaxial with piston 14 and bears against the right hand side of piston 14 along with spacer 34 to which it is secured for actuation of piston 14 to the left when the hand brake lever 40 is actuated to the left by a conventional hand brake mechanism (not shown) that would be connected to the end 40a of the lever 40.

The tubular retainer 29 for the rollers 28 has its right hand end biased by a spring 45 against flange 31 that is maintained normally against shoulder 13a of the housing 13 because of bias of a heavier spring 30. Spring 45 is retained between snap rings 46 and 47 in the actuating rod 19 and the retainer 29 respectively. An annular seal 48 is suitably secured in the cylinder housing 13 at the left hand end thereof to seal a space between the outer periphery of the push rod and the left hand end of the housing 13.

To consider the mode of operation of the spread cylinder device 10, it will be assumed that a service application is applied by admitting fluid under pressure through port 35 to the chamber 17 at a time when the apparatus is in the position illustrated in FIG. 1.

In response to the fluid pressure, piston 14 is moved to the left, moving the tubular application rod 18 to the left, thus wedging the rollers 28 between the conical wedge 26 and the inner periphery of the push rod 16 to cause the push rod 16 to be moved to the left along with the application rod 18 for brake application.

The movement of push rod 16 to the left carries the friction sleeve 21 with it until the friction sleeve 21 strikes the abutment 48 at the end of its free travel portion. The push rod 16 slides through friction sleeve 21 as required to adjust for wear in the brakes as the brakes are applied by the spreading of cylinder device 10.

Upon release of the brakes, fluid pressure is released from the chamber 17 through the port 35, thus permitting the piston 14 to be retracted to the right by the restoration spring 30. This carries the actuating rod 18 to the right, together with the tube 29 carrying the rollers 28 because of spring 45, thus retracting the push rod 16 for its portion of free travel, as determined by the friction sleeve 21, until the friction sleeve 21 strikes a right hand shoulder 13b of the cylinder housing 13. This restriction of further free travel of the push rod 16 to the right, disconnects the friction coupling through the rollers 28 to the actuating rod 18, thus permitting continued retraction of the actuating rod 18, to the right without the push rod, to its fully retracted normal position. The rollers 28 are carried with the actuating rod 18, because of the connection of the actuating rod 18 to the tube 29 through the spring 45, until the right hand end of tube 29 is stopped by the flange 31.

The stopping of the movement of the tube 29 to the right by the flange 31 before the piston 14 has bottomed in its right hand position disengages the actuating rod 18 from the rollers 28 to permit the forced actuation of the push rod 16 to the right to a point of compressing the restoration spring 30 as required to gain clearance for maintenance of the brake shoes (not shown) as required for the replacement of the shoes and the like.

Because of the retraction of the push rod 16 being normally stopped when the friction device 21 strikes the shoulder 13a, the push rod 16 is positioned automatically, without the use of a threaded adjustment device, to compensate for wear of the brake shoes (not shown) so that there will be minimum travel required of the push rod 16 for the next application of the brakes, the only amount of travel required being that to bring the friction device 21 against the stop 48.

Figure 2:
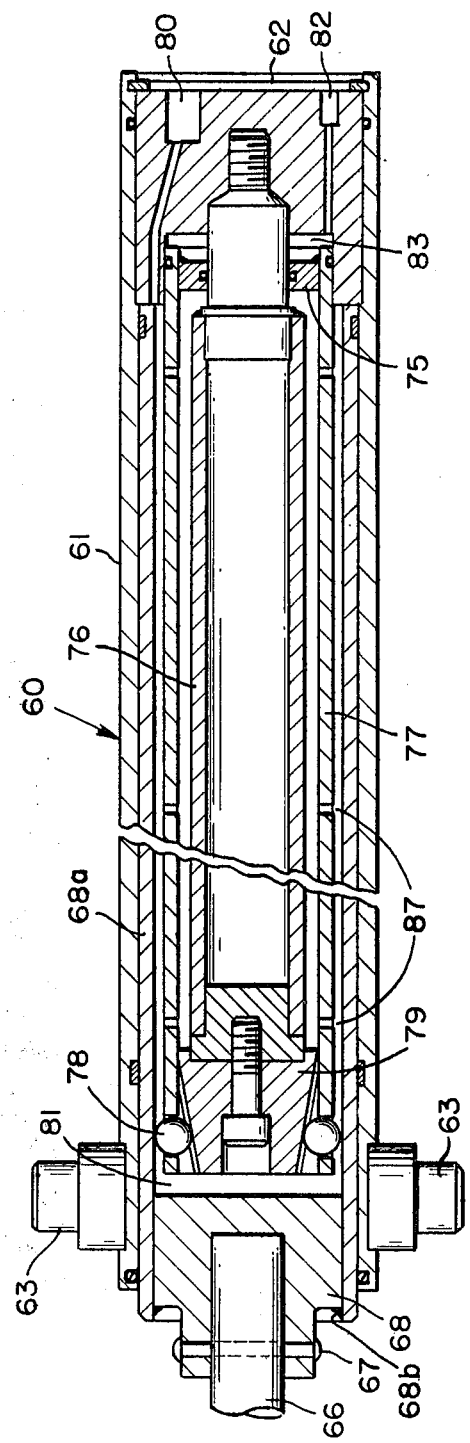
FIG. 2 is an axial sectional view, with some parts broken away, of a modification of the embodiment of FIG. 1.
Figure 3:
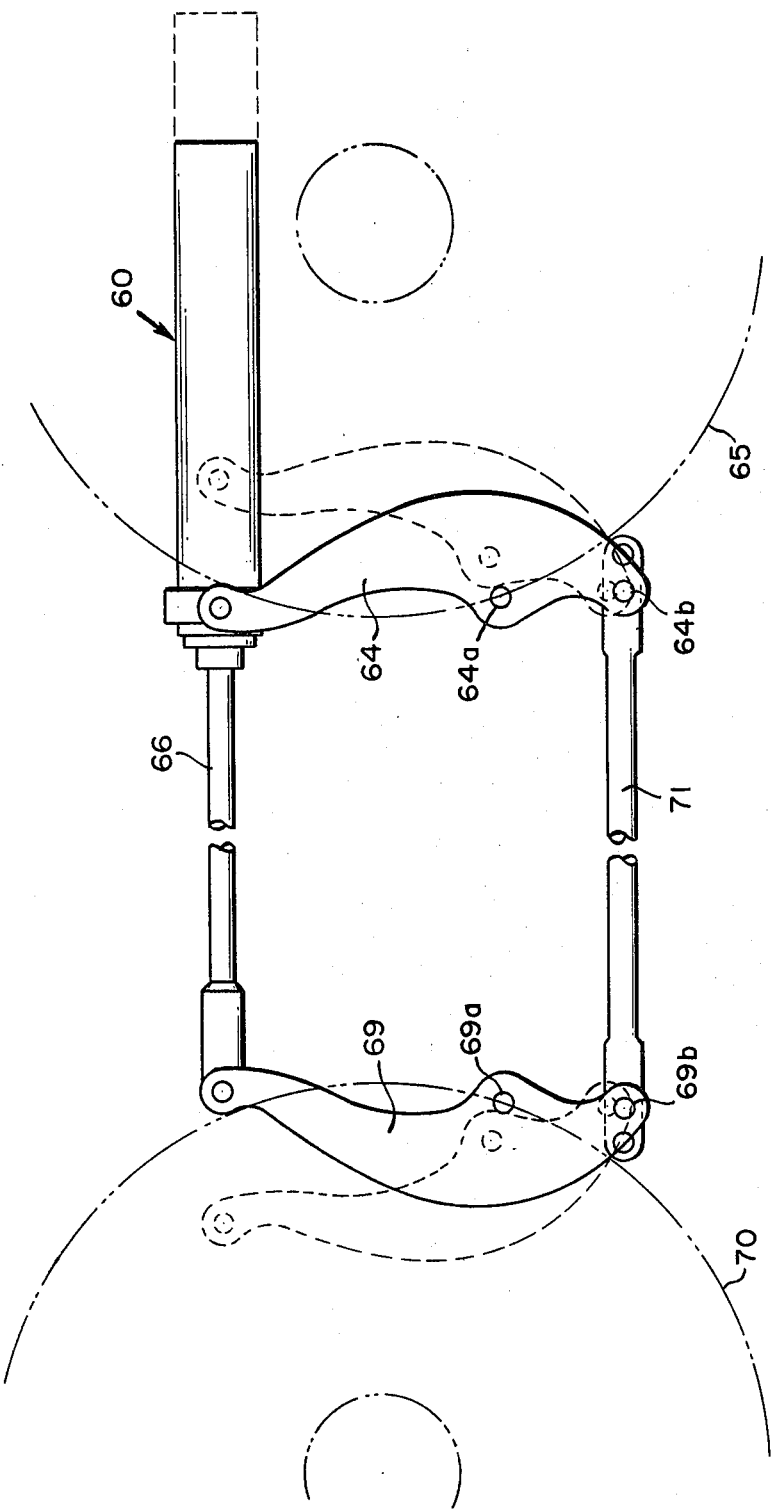
FIG. 3 is a schematic diagram illustrating linkage apparatus for connecting brake control apparatus of FIG. 2 to brake rigging of a freight car.

With reference to FIG. 2, a modification of the present invention is disclosed to apply the locking system of FIG. 1 to the locking of a hydraulically applied spread type hand brake cylinder device 60 that can be used, for example, as an adjunct to a conventional fluid operated freight brake rigging (not shown). The hand brake cylinder device 60 has a cylindrical housing 61 provided with a cover plate 62 at the right hand end thereof. The cylinder housing 61 has trunnions 63 extending outwardly near the left hand end of the housing 61, adapted to be operably connected by a suitable lever 64 (see FIG. 3) to the brake rigging (not shown) at 64a, associated with a tread brake for a right hand wheel 65 of a railway truck. A push rod 66 is suitably secured as by pin 67 (see FIG. 2) to a push rod piston 68 that is axially operable within cylinder 61. The push rod 66 is connected to a lever 69 associated with the left hand wheel 70 of the brake rigging (not shown) of a car associated with the wheel 70. A tie rod 71 connects the lower ends of the levers 64 and 69 at 64b and 69b respectively to provide pivots about which the levers 64 and 69 can be operated by the spread cylinder hand brake device 60.

More specifically, the housing 61 contains two oppositely disposed coaxial hydraulic pistons, one of which is the push rod piston 68 at the left hand end of the housing 61, and the other of which is the locking piston 75 that is slideable on the outer periphery of a tubular fixed locking rod 76. The piston 75 is secured at the right hand end of a tubular moveable locking rod 77 that has a bearing cage at its left hand end for carrying rollers 78. The left hand end of the fixed locking rod 76 has a conical wedge 79 connected thereto for cooperating with the rollers 78 to selectively lock the push rod 66 in its extended position.

In operation, when it is desired to set the hand brake, fluid under pressure is applied through the port 80 to a chamber 81 to the right of piston 68. This causes movement of the push rod 66 to the left relative to the support of the housing 61 by the trunnions 63 to spread the levers 64 and 69 (see FIG. 3) about their pivot points 64b and 69b respectively. Fluid from chamber 81 also passes through small bores 87 in the tubular moveable locking rod 77 to build up a fluid pressure to the left of piston 75 so as to actuate the moveable locking tubular rod 77 to the right, thus wedging the rollers 78 between the inner periphery of a tubular portion 68a of the push rod piston 68, and the fixed locking rod 76. By this arrangement, even though the fluid pressure in the chamber 81 may be reduced, the brakes will be maintained in their applied positions until the hand brake is manually restored to its release position.

To release the lock, fluid pressure is applied through port 82 rather than through port 80, and such pressure is effective to move piston 75 to the left, because of pressure maintained through the rollers 78, and permit the retraction of the push rod 66 to release the hand brakes. Thus the piston 75 is moved to the right for locking the push rod 66 and is moved to the left for releasing the lock of the push rod 66.

Having thus described a fluid brake actuating and locking device having improved hand brake and slack adjusting apparatus as a preferred embodiment of the present invention, together with modifications thereof, it is to be understood that various modifications and alterations may be made to the specific embodiments shown without departing from the spirit or scope of the present invention.

What is claimed is:

1. A combined brake actuator, slack adjuster, and lock for railway vehicle brakes comprising, cylindrical brake housing means containing a fluid operable piston and coaxial adjoining hand brake operable means operable to actuate a coaxial tubular push rod for governing application of brakes of a vehicle through slack adjuster means in response to either fluid pressure in a brake cylinder chamber or actuation of the hand brake operable means, wherein improved slack adjusting means is provided for adjustably connecting the piston to the push rod comprising:
   (a) actuating rod means having an actuating rod, one end of which is connected to the piston and the other end of which extends within the tubular push rod for selectively axially actuating the push rod in accordance with axial actuation of the piston,
   (b) annular locking means disposed within the tubular push rod secured in part to said other end of the push rod and operable to selectively operably connect the actuating rod means to the inner periphery of the push rod, and
   (c) adjusting means including a friction sleeve on a portion of the outer periphery of the push rod having, restricted free axial movement within the housing for causing axial adjustment of the push rod relative to the actuating rod for automatic slack adjustment for wear in the brakes.

2. A combined brake actuator, slack adjuster, and lock for railway vehicle brakes according to claim 1 wherein the annular locking means comprises tubular bearing retainer means disposed coaxially within the push rod and outside of the actuator rod retaining a bearing for selectively locking the actuating rod to the push rod.

3. A combined brake actuator, slack adjuster, and lock for railway vehicle brakes according to claim 2 wherein the tubular bearing retainer means comprises:
   (a) a tubular rod having a bearing retained on one end thereof for selectively locking the actuating rod at said other end to the inner periphery of the push rod, and
   (b) means for biasing the tubular rod axially against a fixed stop to unlock connection of the actuating rod to the push rod after the actuating rod has been retracted axially subsequent to brake application.

4. A combined brake actuator, slack adjuster, and lock for railway vehicle brakes according to claim 3 wherein the biasing means comprises a spring that is disposed on the outside periphery of the actuating rod and inside of the tubular rod and is maintained under compression between a stop on the actuating rod at one end of the spring and a stop on the tubular rod at the other end of the spring.

* * * * *